United States Patent [19]

Walter

[11] 4,130,623
[45] Dec. 19, 1978

[54] METHOD OF EMBOSSING

[75] Inventor: John O. Walter, Vandalia, Ohio

[73] Assignee: General Motors Corporation, Detroit, Mich.

[21] Appl. No.: 675,875

[22] Filed: Apr. 12, 1976

[51] Int. Cl.² .................... B29C 3/00; B29F 5/00
[52] U.S. Cl. .................... 264/293; 264/322; 425/385; 425/394
[58] Field of Search .......... 264/244, 322, 293, 32; 425/385, 394, 355; 156/209, 219, 553

[56] References Cited

U.S. PATENT DOCUMENTS

| 878,513 | 2/1908 | Emerson | 425/810 |
|---|---|---|---|
| 2,536,316 | 1/1951 | Schwartz et al. | 264/293 |
| 2,616,125 | 11/1952 | Colombo | 264/107 |
| 2,722,038 | 11/1955 | Freund | 264/293 |
| 2,962,406 | 11/1960 | Rosa | 156/219 |
| 2,971,278 | 2/1961 | Scholl | 36/11.5 |
| 3,447,199 | 6/1969 | Trimble | 264/320 |
| 3,470,291 | 9/1969 | Johnson | 264/322 |
| 3,819,315 | 6/1974 | Borchard et al. | 425/385 |
| 3,832,111 | 8/1974 | Dunlap et al. | 425/385 |

Primary Examiner—W.E. Hoag
Attorney, Agent, or Firm—Jack I. Pulley

[57] ABSTRACT

In accordance with a preferred embodiment of this invention, a linear stitching design having improved definition is embossed onto the surface of a hot, thermoplastic sheet. During embossing the sheet is placed over a special anvil formed of an elastomer strip arranged in the pattern of the stitching and inlaid in a rigid support member. The support member confines the elastomeric anvil member such that during the embossing operation the anvil promotes more uniform distribution of pressure on the sheet and forces it into full contact with the embossing die.

3 Claims, 8 Drawing Figures

4,130,623

METHOD OF EMBOSSING

FIELD OF THE INVENTION

This invention relates to the thermoforming, and more specifically to the embossing of a thermoformable sheet.

BACKGROUND OF THE INVENTION

In most prior art methods of embossing designs, such as stitching, onto a thermoplastic sheet, both the anvil surface and the embossing die surface were rigid and relatively hard. In addition, the anvil surface was typically flat. The combination of the hard anvil surface and the hard embossing die surface provided an uneven distribution of pressure on the thin thermoplastic sheet as it was being formed; and this often produced undesirable distortions in the thickness of the sheet. In addition, to form raised bosses on the surface of the sheet, it was necessary to force the material to plastically flow from the high pressure debossing areas into the low pressure embossing regions. This required high temperatures, high pressures, and in general, dictated that the process be closely controlled because there was always the danger of projecting die features cutting through the thermoplastic sheet.

Some improvement in the embossed pattern is achieved by employing an unrestrained slab of elastomeric material as the embossing anvil. The elastomeric slab is intended to react to the pressure of the embossing die by undergoing a displacement such that the hot plastic sheet is more uniformly and completely forced into contact with the embossing die. However, I have found that unexpectedly a more sharply detailed pattern can be formed on a plastic sheet by employing as the embossing anvil an elastomeric section inlaid in a rigid supporting member.

Hereinafter, the term embossing is used to denote the overall process of imparting a design onto a formable sheet, wherein said design may have both raised and lowered features.

OBJECTS OF THE INVENTION

This invention provides an improved method of embossing a design onto the surface of a hot pliable plastic sheet. The sheet is pressed between the forming surface of a rigid embossing die and a restrained elastomeric anvil which reacts to the pressure exerted on it by forcing the sheet into more intimate contact with the embossing die surface. By this process, a more faithful reproduction of the design is obtained.

SUMMARY OF THE INVENTION

In accordance with a preferred embodiment of this invention, a linear stitching design having improved definition is embossed on the surface of a hot thermoplastic sheet by pressing the sheet between a suitable embossing die surface and an elastomeric anvil strip member which parallels the pattern to be embossed and is restrained by a rigid support member. By confining the elastomeric member in the region underlying where the pattern is being formed on the strip, the flexible anvil member is better able to react to the pressure of the embossing die and produce an embossment of fine, sharp detail. The embossing die surface is characterized by raised and/or depressed features of such a shape so as to impart the preferred stitching design onto the pliable sheet. The elastomeric anvil has a durometer A hardness of from about 35 to about 60.

As the plastic sheet is pressed between the hard embossing die surface and the restrained, but yieldable, elastomeric anvil surface, a portion of the sheet is displaced into the anvil.

The displacement of the plastic sheet into the anvil causes a portion of the anvil to flow upward and to urge the sheet into the recesses of the embossing die. This reaction of the elastomeric anvil is due to the substantially incompressible nature of an elastomer and the fact that the anvil is restrained on three sides. The effect of this reaction of the subject anvil is a leveling of the pressure profile across the deforming sheet and a more faithful reproduction of the design on the surface of the sheet. Comparatively, when a rigid material is used as the anvil surface and reasonable pressures maintained, the recessed portions of the embossing die may never contact the plastic sheet and therefore the definition of the embossed design is poor.

On the other hand, when a flat elastomeric sheet is used as the anvil, a significant portion thereof is pushed out from under the die. When this occurs, there is not enough elastomer remaining under the die to adequately urge the sheet into the recesses of the embossing die.

This invention provides the practitioner with improved definition and significantly reduces the need for the critical controls, typical of prior art processes, by reducing the danger of the embossing die piercing the sheet. In addition, this invention assures a maximum volume of elastomer under the embossing die to urge the sheet into the deepest recesses of the embossing die.

These and other features and advantages of the subject invention will be more readily understood in view of a detailed description thereof to include a description of the attached drawings, which briefly are:

DETAILED DESCRIPTION OF THE INVENTION

Figure 1:
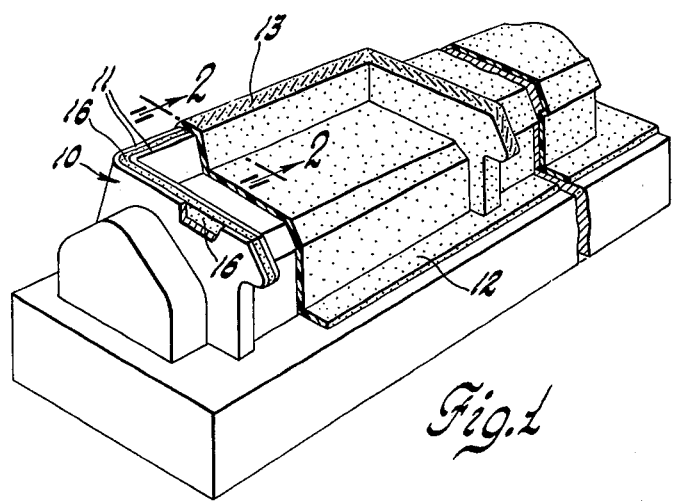
FIG. 1 is a perspective view of a formed plastic sheet, cut away in part, and draped over the surface of a vacuum forming buck in the shape of an automotive instrument pad cover; the subject embossed stitching pattern is on the ridge which surrounds the instrument cluster.

A suitable sheet material for the practice of this invention includes any thermoformable polymeric sheet material. Preferably, the sheet is formed from any of the well-known thermoplastic materials such as poly(vinyl chloride) (PVC), acrylonitrile-butadiene-styrene (ABS) and the polyolefins. However, thermoformable materials having a relatively low degree of cross-linking, and which therefore would not be considered thermoplastic materials, may also be used. In general, any thermoformable condensation or addition polymer would be suitable in this application.

The embossing die is suitably any of the conventional types typically used in the embossing of thermoplastic sheet materials. Such dies may be made of any rigid material including steel, aluminum or other metals and any of several well-known rigid polymers, and glass or mineral filled versions thereof. The anvil body which holds and restrains the elastomeric anvil may also be formed of any of the aforementioned conventional rigid die materials.

The relatively soft elastomeric anvil is preferably formed from any of the well-known elastomeric materials that have a durometer A hardness reading in the range of from about 35 to about 60. However, this material must also be able to withstand the temperatures typically used in thermoforming operations which may range up to as high as 350° to 400° F. or more. Furthermore, this elastomer preferably is able to withstand many thousands of deformation and recovery cycles at operating temperatures without a significant degree of compression set. Suitable elastomers include, EPDM rubber, natural rubber, cast urethane, polybutadiene, and the like. In addition, the elastomeric surface must not stick to the hot thermoformable sheet; this may be accomplished by either a careful selection of the elastomeric resin or by the use of suitable release agents such as the silicones or fluorocarbons. In certain applications it may be advantageous to use an elastomeric surface that has been preformed to fit the contours of the forming surface.

Ideally, the inlaid elastomeric anvil is just wide enough to allow the embossing die to displace a portion of the plastic sheet into the anvil without a significant risk of striking the side walls which hold the anvil and without pinching or cutting the sheet. Nevertheless, the anvil may be somewhat wider than the ideal and yet be restrained and within the scope of the invention. It is evident, however, that as the width of the anvil increases relative to the width of the embossing die, the effect of the restraining forces exerted by the side walls will be reduced. It is believed that when the width of the inlaid anvil approaches about three or four times that of the embossing die, or the embossed pattern, most beneficial effects of restraining the anvil have been lost.

It is to be noted, that a vacuum may also be applied to the sheet through the embossing die to promote a more accurate replication of the desired pattern. This, however, is considered an extraordinary measure which need be used only where there are either very deep recesses in the embossing die or other factors which would alter the normal embossing conditions.

In accordance with the practice of this invention, a linear stitching pattern 13, in FIG. 1, is embossed on the surface of a poly(vinyl chloride), (hereinafter PVC), sheet having a thickness in the range of from 15 to about 100 mils. In this particular example, the embossing operation is combined with a vacuum forming step which forms the sheet to the shape of an automotive instrument pad cover. During this process the temperature of the PVC should not drop below 280° F. since below this point, PVC retains a memory of its former shape and will tend to revert to that shape during any subsequent exposure to heat. This may be accomplished by initially heating the sheet to about 330° F. and completing both the embossing and the vacuum forming operations within a period of from about ½ to about 5 seconds, preferably about 2 seconds; the embossing die is typically operated at its ambient temperature; and the vacuum forming buck, to include the elastomeric anvil surface, is preferably cooled to from about 110° F. to about 140° F. The embossing pressure may vary from about 5 to about 40 pounds per inch of stitching pattern, preferably about 10. These conditions are specifically for the process of embossing a linear stitching pattern onto a PVC sheet and are obviously somewhat dependent on the sheet material and the embossed design. However, it is well within the skill of the art, given this disclosure, to adjust these conditions to other materials and designs.

The attached drawings have been included to provide a better understanding of the subject process. FIG. 1 is a perspective view of a conventional vacuum forming buck 10 having a forming surface 15 in the shape of an automotive instrument pad cover. A cut-away portion of a vacuum formed sheet 12 is shown draped over buck 10. The forming buck 10 is typically equipped with a plurality of passages (not shown) leading from the forming surfaces 15 to a vacuum source (not shown). During the forming operation, a vacuum is applied to the undersurface of the hot thermoplastic sheet 12 to draw it against the contours of the forming surfaces 15. After the sheet 12 has been formed against buck 10, the stitching pattern 13, or other design, is impressed on the surface of sheet 12 by embossing die 14 (see FIGS. 2a–2c). The stitching pattern 13 follows a linear path along the ridge of that portion of the instrument pad enclosing the instruments.

Figure 2A:
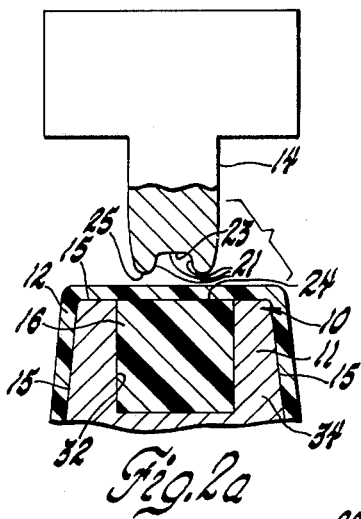
FIG. 2a is an enlarged sectional view taken, prior to the embossing step, at section 2—2 of FIG. 1 showing the thermoplastic sheet positioned between the embossing die and the subject restrained elastomeric anvil, which is inlaid in the vacuum forming buck as shown in FIG. 1.

In FIG. 2a it is seen that the portions of buck 10 underlying the sheet 12 in the region where the embossed stitching pattern 13 is to be formed is a composite structure. Inlaid in the rigid portion 34 of buck 10 is an elastomeric anvil strip 16 which runs along the entire ridge 11 of the buck 10. Elastomeric anvil strip 16 is wholly supported or restrained in the rigid portion 34 of buck 10 except for the upper surface 24 of strip 16 which in this case is coplanar with the forming surface 15 of the buck 10. Anvil strip 16 lies immediately under the portion of sheet 12 where the stitching pattern 13 is to be embossed and is seen (FIGS. 2b and 2c) to be somewhat wider than the stitching pattern 13 and the embossing die 14 that forms it. The rigid embossing die 14 is aligned with the elastomeric anvil 16.

Figure 2B:
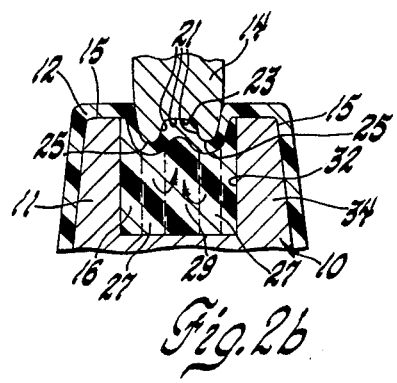
FIG. 2b is an enlarged sectional view taken at section 2—2 of FIG. 1 showing the thermoplastic sheet as it is being pressed between the rigid embossing die and the inlaid elastomeric anvil.

FIG. 2b shows the thermoplastic sheet being formed between embossing die 14 and the elastomeric anvil 16. The thermoplastic sheet 12 is forced into direct contact with the entirety of the embossing surface 21 of die 14 by the elastomeric anvil 16 that is restrained laterally and downwardly by rigid portion 34 of buck 10 and therefore cannot be pushed out from under the die 14.

These conditions maintain the maximum volume of elastomer under die 14 and allow the elastomer to urge the sheet 12 into the recesses 23 of the embossing surface 21. This provides the sharpest reproduction of the stitching design. Since the die 14 and the buck 10 are typically much cooler than the sheet 12, the desired shape will be quickly frozen into sheet 12.

The intimate contact between the embossing surface 21 and the plastic sheet 12 and the excellent replication of the die features are made possible by the yieldable and resilient nature of the elastomeric anvil portion 16 of forming surface 24 and the fact that the elastomer is held directly under die 14. As the die 14 presses the sheet 12 into the yieldable elastomeric anvil 16, those sections 27 (see FIG. 2b) of anvil 16 which are opposite the raised projections 25 of die 14 yield immediately, and there is no drastic pressure increase at these points. Futhermore, those sections 29 of elastomeric portion 16 which are opposite recessed features 23 of die 14, do not yield with section 27. In fact, the elastomer in sections 27 will be displaced primarily into sections 29 due to the incompressible nature of elastomers. This displacement will urge the sheet 12 into recesses 23 of die 14. Another effect of this reaction of the anvil 16 is a leveling of the pressure profile across the deforming sheet 12 which promotes a faithful reproduction of the design on the sheet 12 and greatly reduces the danger of die 14 puncturing sheet 12. The fact that the elastomeric anvil 16 is set into and restrained by the rigid portion 34 of vacuum buck 10 prevents the elastomer from being pushed to the side of the die 14 and thereby insures that the maximum possible volume of elastomer will be directly under die 14 to urge the sheet into the recesses 23 of die 14. It is believed that this mechanism is the key to the improved detail definition achieved by the subject process. However, this description of one theory why the restrained elastomeric anvil provides improved definition is included only for the benefit of the practitioner and is not intended as a limitation on the scope of this invention.

Figure 2C:
FIG. 2c is an enlarged sectional view taken at section 2—2 of FIG. 1 showing the formed thermoplastic sheet after the embossing die has been withdrawn.

FIG. 2c is a sectional view taken through the stitching pattern 13 at 2—2 which shows the thermoformed plastic sheet 12 after die 14 has been withdrawn. It is to be noted that the stitching pattern 13 has been accurately reproduced on the sheet 12 with little distortion of the thickness of sheet 12. Therefore, sheet 12 retains the physical properties which it had before the embossing process.

Figure 3:
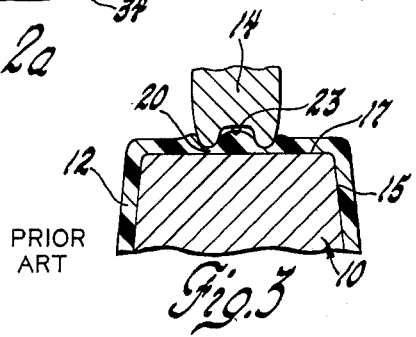
FIG. 3 is an enlarged sectional view similar to FIG. 2b showing the thermoplastic sheet as it is being pressed between an embossing die and a prior art rigid anvil surface.

FIG. 3 illustrates one of the prior art problems which is solved by the subject invention. More specifically, FIG. 3 is an enlarged sectional view, taken at a section, similar to 2—2 in FIG. 1, which shows the plastic sheet 12 as it is pressed between the embossing die 14 and a wholly rigid flat anvil surface 17. It is noted that the only mechanism by which the material of sheet 12 can be forced into recess 23 of die 14, and thereby faithfully replicate the design, is for the material to plastically flow from the high pressure areas 20, which are directly under the projections of die 14, into the recesses 23. The rigid anvil surface 17 cannot act directly to press sheet 12 into recess 23. This condition necessarily dictates a severe thinning of the thermoplastic sheet in regions 20. In turn, this thinning will result in a significant loss of strength.

In addition, since this is the only method by which material may be forced into recess 23 it is evident that the details of the recess will not be accurately reproduced unless severely high pressures and temperatures are employed. These conditions must be carefully controlled to prevent die 14 from cutting through sheet 12 at point 20.

Figure 4:
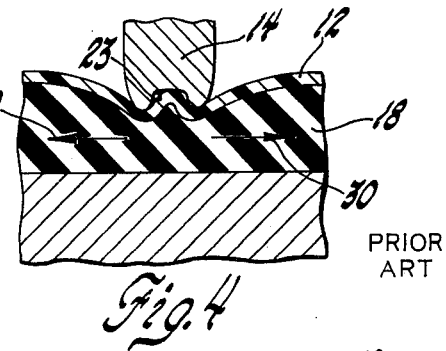
FIG. 4 is an enlarged sectional view similar to FIG. 2b showing a thermoplastic sheet as it is being pressed between an embossing die and a laterally extending unrestrained elastomeric anvil.

FIG. 4 illustrates another approach which inherently cannot produce embossed designs having a depth and definition equal to those produced by the subject method. As shown in FIG. 4, this approach employs a laterally extending unrestrained elastomeric anvil 18 as compared to the subject elastomeric anvil which is inlaid in a support member, which typically is a vacuum forming buck.

A primary drawback of the approach shown in FIG 4, is that as the die 14 presses sheet 12 against the unrestrained elastomeric anvil 18, the anvil elastomer is pushed out from under die 14 in the direction of arrows 30, because this is the path of least resistance, especially when compared to the alternative of flowing up into the narrow recess 23 of die 14.

Comparatively, in the subject method the lateral path is not available since the elastomeric anvil is inlaid in the vacuum buck. More specifically, referring to FIG. 2b, the side walls 32 of the rigid portions 34 of the buck prevent the elastomer from flowing laterally out from under the embossing die 14. This promotes improved definition by forcing the anvil into the recesses 23 of die 14 as there is simply no other path.

This action may be more readily understood in view of the fact that elastomers are substantially incompressible. Therefore, since the die 14 pushes the sheet 12 into anvil 16, the displaced volume must move upward into the recesses 23 since it cannot move laterally or downwards.

Figure 5:
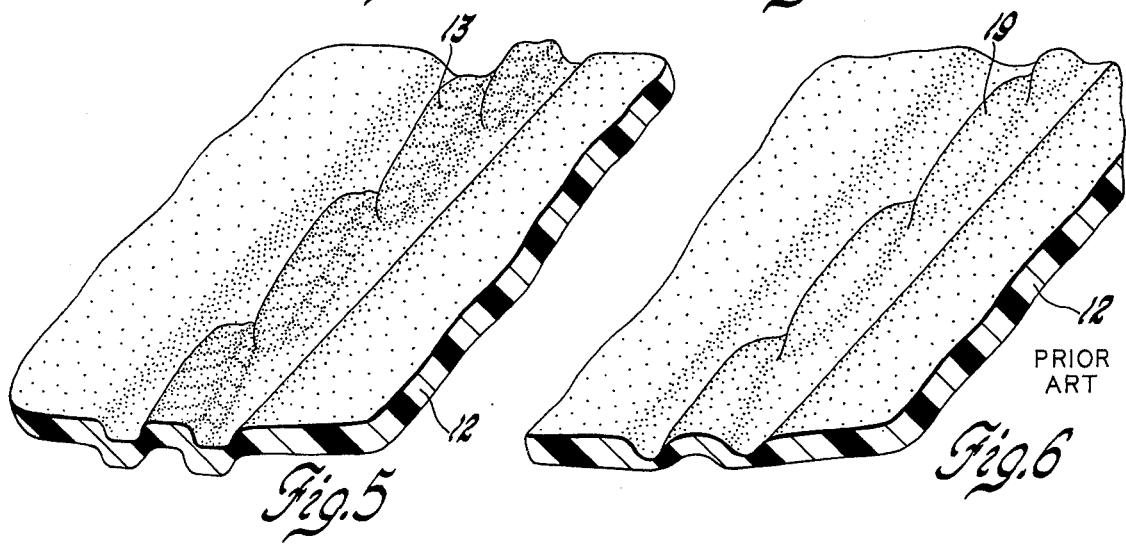
FIG. 5 is a perspective view representing the well defined stitching design formed by the subject process.
Figure 6:
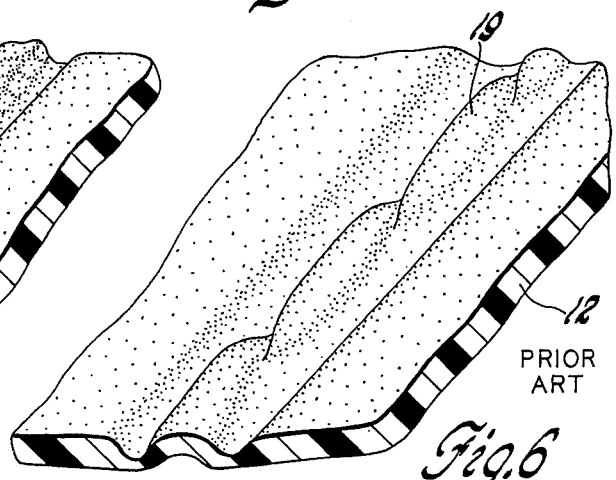
FIG. 6 is a perspective view representing a stitching design formed by a method employing a laterally extending elastomeric anvil.

The efficacy of the subject method and its superiority, when compared to methods employing an unrestrained elastomeric anvil, are graphically depicted in FIGS. 5 and 6. These illustrations were taken from samples which were embossed simultaneously by both methods under identical conditions. This was accomplished by using an elastomeric anvil having a restrained portion and an unrestrained portion. Each section was about two inches long. A preheated sheet was placed over this anvil and embossed with one die that extended over both sections. The results of this test were easily evaluated since one sheet had been embossed by both methods under the same temperature, pressure and duration. As shown in FIG. 5, the stitching pattern 13 produced by the subject method provided a distinct improvement over the stitching pattern 19 which was embossed against an unrestrained elastomeric anvil such as that shown in FIG. 4.

While my invention has been described in terms of certain specific embodiments, it will be appreciated that other forms thereof could readily be adapted by one skilled in the art. Therefore, the scope of my invention is not to be limited to the specific embodiments disclosed.

I claim:

1. A method of embossing a linear simulated stitiching design onto the surface of a thermoformable plastic sheet which has been preheated to a thermoforming temperature and which has a thickness in the range of from about 15 to about 100 mils, said method comprising the steps of:

(a) pressing the preheated sheet between an embossing die having features to impart said stitching design onto said sheet and an elastomeric anvil which is inlaid into the surface of a support member and being arranged in the course of said design, the support member restricting the lateral displacement of the anvil closely adjacent the design during pressing so that the anvil reacts to the pressure of the die by forcing the sheet closely against the entire embossing surface of the die to more faithfully reproduce the stitching design thereon; and then (b) separating the die and the anvil and removing the embossed sheet therefrom.

2. A method of embossing a generally linear design on a surface of a thermoformable plastic sheet preheated to a thermoforming temperature and having a thickness in the range of from about 15 to about 100 mils, said method comprising the steps of:

(a) pressing the sheet between an embossing die having features for imparting a desired said design onto the surface of the sheet and an elastomeric anvil which is inlaid into the surface of a support member and is thereby restrained closely adjacent said design the anvil being slightly wider than the design to be embossed and being arranged in the course of the design, the restrained elastomeric surface reacting to the die pressure by urging the sheet into intimate contact with the features of the die, whereby the desired design is faithfully reproduced on the surface of the sheet; and (b) separating the die and the anvil and removing the embossed sheet therefrom.

3. A method of embossing a linear simulated stitching pattern on a thermoformable plastic sheet comprising:

(a) heating the sheet to a thermoforming temperature, (b) placing the heated sheet over a composite anvil formed of an elastomeric strip inlaid in a rigid support member, the strip being slightly wider than the linear pattern to be embossed and being arranged in the course of the pattern, (c) pressing an embossing die into a portion of the sheet overlying the elastomeric strip, the support member serving to restrict the lateral displacement of the strip closely adjacent said pattern so that strip reacts to the pressure of the die by forcing the sheet closely against the entire embossing surface of the die to faithfully reproduce the stitching patterns thereon, and (d) retracting the die and removing the embossed sheet from the anvil.

* * * * *